No. 870,779. PATENTED NOV. 12, 1907.
W. G. HARTWIG.
ELECTRIC SOLDERING IRON.
APPLICATION FILED MAR. 21, 1907.
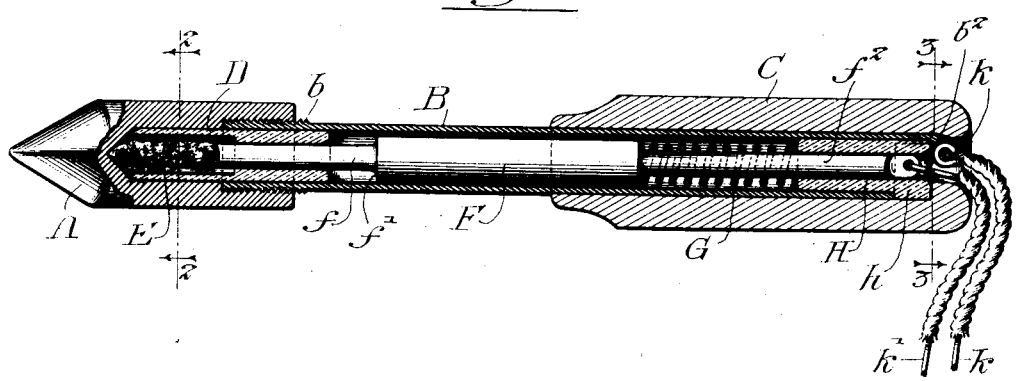
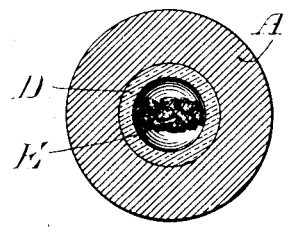
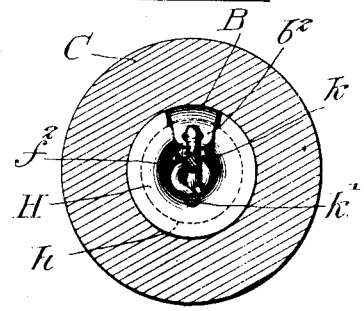
Witnesses:
Inventor:
William G. Hartwig
By Peirce & Fisher
Attys.

UNITED STATES PATENT OFFICE.

WILLIAM GEORGE HARTWIG, OF CHICAGO, ILLINOIS.

ELECTRIC SOLDERING-IRON.

No. 870,779.   Specification of Letters Patent.   Patented Nov. 12, 1907.

Application filed March 21, 1907. Serial No. 363,547.

*To all whom it may concern:*

Be it known that I, WILLIAM GEORGE HARTWIG, a citizen of the United States, residing at Chicago, in the county of Cook and State of Illinois, have invented certain new and useful Improvements in Electric Soldering-Irons, of which I do declare the following to be a full, clear, and exact description, reference being had to the accompanying drawing, forming part of this specification.
Figure 1 is a view in central longitudinal section through an electric soldering iron. Fig. 2 is a view in transverse section on line 2—2 of Fig. 1. Fig. 3 is a view in transverse section on line 3—3 of Fig. 1, Figs. 2 and 3 being upon an enlarged scale.
The present invention has for its object to provide an electric soldering iron in which the heat generated within the head of the iron shall be applied at the most effective point and the invention consists in the features of improvement hereinafter described, illustrated in the accompanying drawing and more particularly pointed out in the claims at the end of this specification.

A designates the copper head of the soldering iron that is bored out or chambered as shown. The outer end portion of the chamber of the head A is interiorly screw-threaded to receive the exterior screw-thread $b$ that is formed upon one end of the hollow stem B. The opposite end of the stem B has fitted thereto a tubular handle C of suitable material. Within the chamber of the head A is set an insulating sleeve D of porcelain or other suitable insulating material and within this insulating sleeve D is placed a solid body of carborundum crystal E that will be pressed against the head A by means of a plunger F that is carried within the sleeve B. The plunger F has a reduced stem $f$ passing through the insulating sleeve D and a shoulder or offset $f'$ on the plunger F serves to limit the extent of the movement of the sleeve B towards the head A and thus guards against any danger of short-circuiting by reason of the contact of the end of the plunger with the head A. The outer end of the plunger F is formed with a stem $f^2$ that is encircled by a coil-spring G that serves to force the plunger F towards the head A. The stem $f^2$ of the plunger F passes through an insulating sleeve H that is held within the outer end of the tubular handle C, this insulating sleeve H being preferably formed with a flange $h$ that is cut away at one side to receive the terminal extension $b^2$ at the outer end of the sleeve B. To this terminal extension $b^2$ is connected one of the conductor wires K and the other conductor wire K' of the circuit is connected to the outer end of the plunger stem $f^2$. The insulating sleeve D serving as it does to hold the high resistance material E out of contact with the head A of the soldering iron except at the end of the sleeve insures the application of the heat due to the passage of current through the high resistance material to that part of the soldering iron to which the heat may be most effectively used. The insulating sleeve D and the insulating sleeve H serve also to hold the plunger out of contact with the sleeve B and thus prevent the short-circuiting of the current between such parts. The plunger effectively serves to insure a constant contact between the high resistance material and the head A of the soldering iron.

The operation of my improved soldering iron will be readily understood. Current will pass by one of the conductor wires K to the sleeve B and through the head A and high resistance material E to the plunger F and thence to the other conductor wire K'. When it is desired to insert a new piece of carborundum within the chamber of the head A, the head can be unscrewed from the sleeve D for such purpose.

It is manifest that the precise details of construction above set out may be varied without departure from the spirit of the invention.

Having thus described my invention what I claim as new and desire to secure by Letters Patent is:—

1. An electrically heated tool comprising a chambered head, a tubular sleeve connected to said head and provided with a handle, a sleeve of insulating material within said head, a body of high resistance material within said insulating sleeve, and a plunger passing through said insulating sleeve and serving to force said body of high resistance material against said head, said plunger being provided with an offset part to limit the extent of its movement.

2. An electric soldering iron comprising a chambered soldering head, a tubular stem connected to said head and provided with a handle, an open-ended insulating sleeve arranged within said chambered soldering head, a body of high resistance material within said insulating sleeve, a metallic conductor passing through said insulating sleeve and means for causing said conductor to normally hold said body of high resistance material against said soldering head.

3. An electric soldering iron comprising a chambered soldering head, a tubular sleeve connected to said soldering head and provided with a handle, an open-ended insulating sleeve within said tubular sleeve and extending into the chamber of the soldering head, a body of high resistance material within said insulating sleeve and bearing against said soldering head, an insulating sleeve within the outer end of said tubular sleeve, a metallic plunger arranged within said insulating sleeves and means for causing said plunger to force said body of high resistance material against the soldering head.

4. A soldering iron comprising a soldering head, a tubular sleeve connected to said soldering head, a sleeve of insulating material within said tubular sleeve, high resistance material within said insulating sleeve and bearing against the soldering head and a spring-actuated plunger engaging said high resistance material.

5. An electric soldering iron comprising a soldering head constituting one of the terminals of the electric circuit, a body of carborundum crystal bearing against said soldering head, an insulating sleeve surrounding said body of carborundum and a metallic conductor engaging said body of carborundum and constituting the other terminal of said circuit.

6. An electric soldering iron comprising a chambered soldering head, a tubular sleeve screw-threaded to said 12 soldering head, an open-ended insulating sleeve within said tubular sleeve and within the chamber of the soldering head, a body of high resistance material within said insulating sleeve, a metallic plunger bearing against said body of high resistance material and a spring for holding said plunger into contact with said body of high resistance material and for forcing said body against the soldering head.

7. An electric soldering iron comprising a soldering head, a stem connected to said soldering head, a tubular insulating sleeve, a body of high resistance material within said insulating sleeve and a spring-actuated plunger bearing against said body of high resistance material and having a stop or shoulder to limit its movement.

8. An electric soldering iron comprising a soldering head, a tubular stem for said soldering head, a body of high resistance material bearing against said soldering head, a spring-actuated plunger bearing against said body of high resistance material and insulating sleeves at the inner and outer ends of said spring-actuated plunger.

WILLIAM GEORGE HARTWIG.

Witnesses:
MAE C. LINDAUER,
KATHARINE GERLACH.